(12) United States Patent
Sukup et al.

(10) Patent No.: US 6,254,329 B1
(45) Date of Patent: Jul. 3, 2001

(54) SWEEP AUGER

(75) Inventors: Charles E. Sukup, Dougherty; Eugene G. Sukup, Hampton, both of IA (US)

(73) Assignee: Sukup Manufacturing Company, Sheffield, IA (US)

( * ) Notice: Subject to any disclaimer, the term of this patent is extended or adjusted under 35 U.S.C. 154(b) by 0 days.

(21) Appl. No.: 09/584,521

(22) Filed: May 31, 2000

(51) Int. Cl.⁷ .............................. B65G 65/46; B65G 69/08
(52) U.S. Cl. ............................................ 414/310; 414/311
(58) Field of Search ...................... 414/310, 311, 414/319

(56) References Cited

U.S. PATENT DOCUMENTS

| | | | |
|---|---|---|---|
| 3,487,961 | * | 1/1970 | Neuenschwander ............. 414/310 X |
| 4,601,598 | * | 7/1986 | Schwartz et al. ................... 401/88 X |
| 4,619,577 | * | 10/1986 | Swanson ........................... 414/310 X |
| 4,669,941 | * | 6/1987 | West et al. ............................ 414/310 |
| 4,701,093 | | 10/1987 | Meyer .................................. 414/312 |
| 5,123,186 | * | 6/1992 | Matushita et al. ...................... 37/251 |
| 5,410,825 | * | 5/1995 | Perrelli .................................. 37/254 |
| 5,511,925 | * | 4/1996 | Muth .................................... 414/310 |

FOREIGN PATENT DOCUMENTS

| | | | |
|---|---|---|---|
| 3330123 | * | 12/1983 | (DE) . |
| 1256579 | * | 2/1961 | (FR) ..................................... 414/310 |
| 2517285 | * | 6/1983 | (FR) ..................................... 414/310 |

* cited by examiner

Primary Examiner—Steven A. Bratlie
(74) Attorney, Agent, or Firm—Zarley, McKee, Thomte, Voorhees & Sease

(57) ABSTRACT

A sweep auger apparatus is radially disposed within a circular bin for moving a free-flowing granular material across the floor of the bin towards the center of the bin. A motor is connected to the radial inner end of the auger shaft to rotate the auger flighting about its horizontal axis. A drive wheel is connected to the radial outer end of the auger shaft for supporting the outer end of the auger shaft and for revolving the auger around the central vertical axis of the bin. The improved sweep auger includes panels or a tube connected to the backboard of the auger so as to reside beneath the auger flighting, and thereby minimize the amount of granular material left on the floor as the sweep auger revolves around the bin floor. The panels are adjustably mounted to accommodate variations in the level of the bin floor.

16 Claims, 4 Drawing Sheets

SWEEP AUGER

BACKGROUND OF THE INVENTION

This invention relates to a sweep auger for moving particulate material across the floor of a circular storage bin toward the center of the bin.

Sweep augers have long been used to unload grain or other granular or particulate material from circular storage bins. A conventional sweep auger is radially disposed and rotates about its longitudinal axis to drag the granular material to an unloading sump at the center of the bin. Simultaneously, the auger revolves around the central vertical axis of the bin to advance across the bin floor in a sweeping action. The auger shaft typically is rotated by power means connected to the radial inner end of the shaft. A drive wheel is attached to the radial outer end of the shaft for rotation therewith to support the outer portion of the auger, as well as to assist in driving the auger in a sweeping motion. A speed reduction mechanism may be provided on the drive wheel such that the wheel rotates at a slower speed than the auger shaft, as described in Applicant's U.S. Pat. No. 4,701,093.

Conventional sweep augers are spaced a short distance above the floor of the bin. Such spacing inherently leaves a small amount of grain on the floor which is not picked up by the auger and moved to the sumps of the bin. Such leftover grain is wasted.

Therefore, a primary objective of the present invention is the provision of an improved sweep auger which minimizes the amount of grain left on the floor of the bin.

Another objective of the present invention is the provision of an improved sweep auger having an attachment adjacent the trailing edge of the auger to enhance removal of grain from the bin.

Another objective of the present invention is the provision of an improved sweep auger having an adjustable panel attached to the rear of the backboard, with the adjustability allowing for variances of the floor level due to uneven concrete or steel floor installation, and for other equipment, such as sumps installed in the floor.

A further objection of the present invention is the provision of an improved sweep auger having a round tube attached to the backboard, with the round design allowing easy passage over obstructions on the bin floor.

Another objective of the present invention is the provision of an improved sweep auger which is economical to manufacture and durable in use.

These and other objectives become apparent from the following description of the invention.

SUMMARY OF THE INVENTION

The improved sweep auger of the present invention is intended for use in a round storage bin, and includes a shaft with a radial longitudinal axis and opposite inner and outer ends. Auger flighting extends along the shaft, with the flighting have a leading edge and a trailing edge. A backboard extends along the shaft behind the trailing edge of the flighting. A support and drive wheel is connected to the auger at the outer end thereof. A drive train is operatively connected to the shaft and to the drive wheel to rotate the shaft and auger in a horizontal plane about the vertical center axis of the bin. The improvement in the sweep auger comprises a flat or tubular attachment mounted to the backboard and extending downwardly therefrom into close proximity to the bin floor so as to minimize the grain left behind when the auger sweeps around the bin floor. The attachment is adjustably mounted on the backboard to accommodate variances in the bin floor.

DETAILED DESCRIPTION OF THE DRAWINGS

Figure 1:
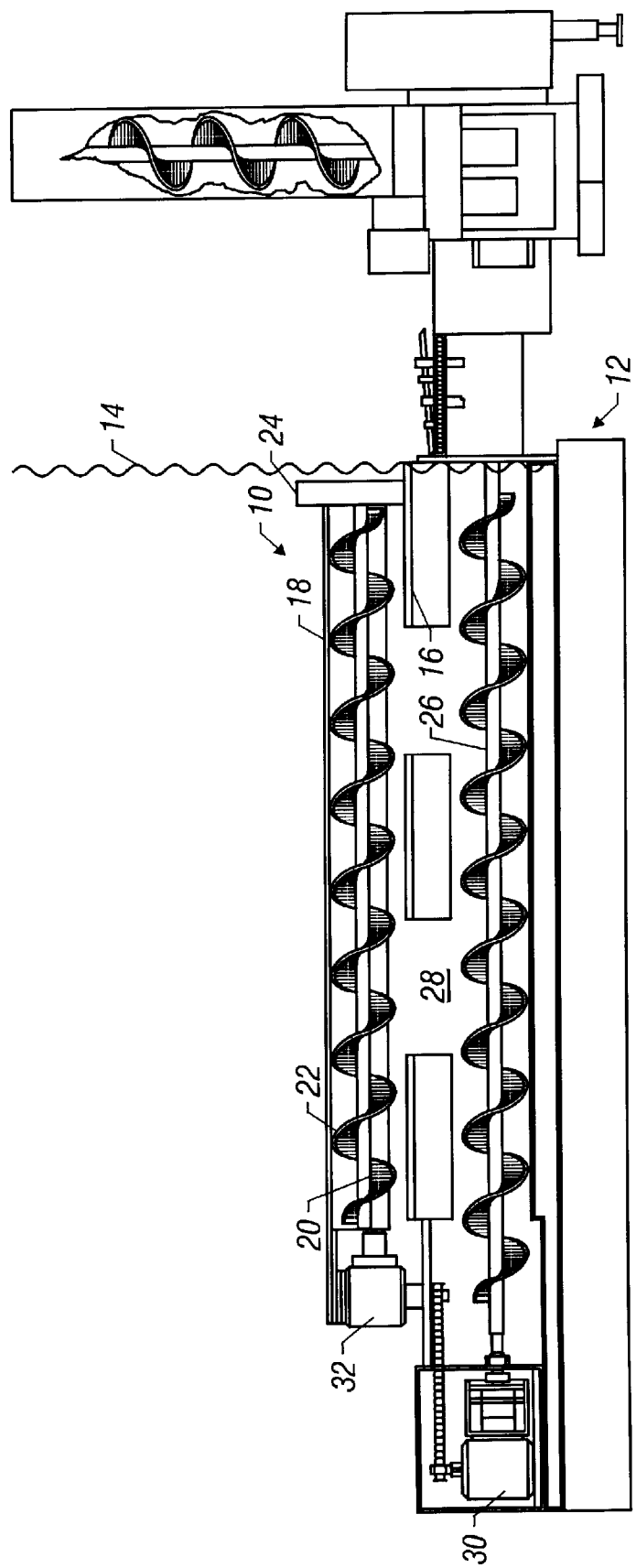
FIG. 1 is a partial side elevation view of the sweep auger of the present invention as mounted in a circular grain storage bin.

The sweep auger apparatus of the present invention is generally designated by the reference numeral 10 in the drawings. The auger 10 is adapted for use in a circular grain storage bin 12 having a vertical generally cylindrical sidewall 14 and a circular false bottom or floor 16. Such a bin is disclosed in Applicant's U.S. Pat. No. 3,532,232, which is incorporated herein by reference.

The sweep auger apparatus 10 includes a radially extending sweep auger 18, which is rotatably mounted within the bin 12 above the floor 16. The sweep auger 18 includes a radially extending shaft 20 with auger flighting 22 extending along the length thereof. The auger apparatus 10 further includes a support and drive wheel 24 on the outer radial end of the shaft 20.

An unloading auger 26 extends beneath the floor 16. Openings 28 in the floor 16 defined sumps through which the grain flows by gravity for removal from the bin 12 by the unloading auger 26.

A drive train rotates the sweep auger 18 and the unloading auger 26. More particularly, a drive is operatively connected to a gear box 30 which is connected to the unloading auger 26 to rotate the auger 26 about its longitudinal axis. The gear box 30 is also operatively connected to a gear box 32 which rotates the sweep auger 18 about the longitudinal axis of the shaft 20, and simultaneously drives the drive wheel 24. A clutch is provided in the drive train such that the unloading auger 26 can be operated without operating the sweep auger 18.

The flighting 22 of the sweep auger 18 includes a leading edge 34 and a trailing edge 36. A backboard 38 extends along the length of the sweep auger 18 behind the trailing edge 36 of the flighting 22.

The above construction is conventional and does not constitute a part of the present invention.

Figure 2:
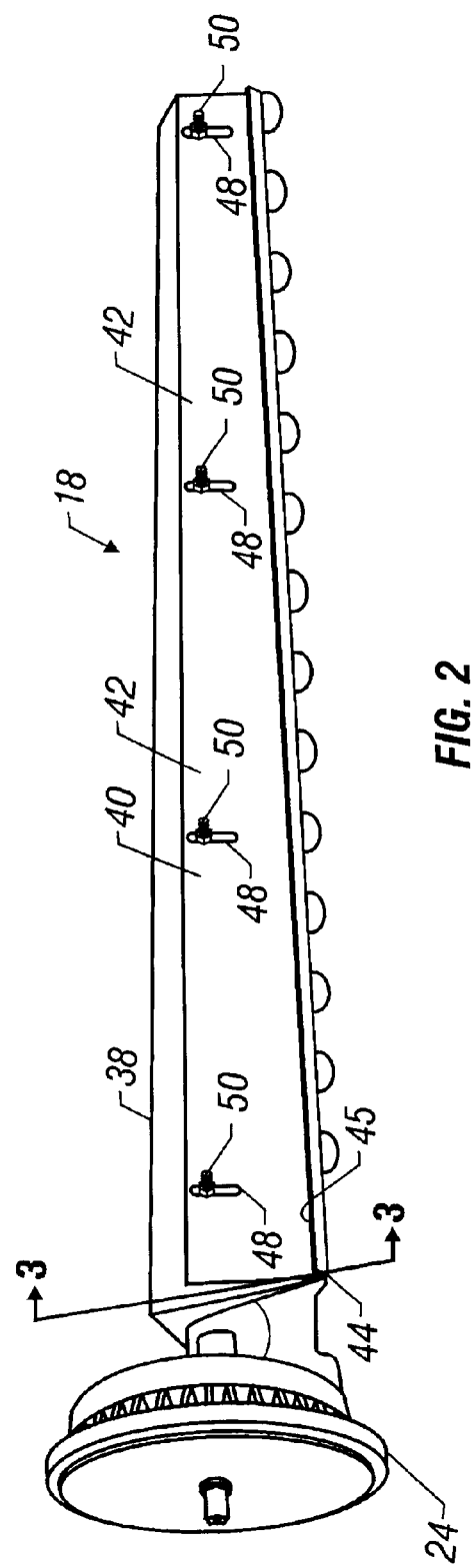
FIG. 2 is a rear perspective view of the improved sweep auger of the present invention.
Figure 3:
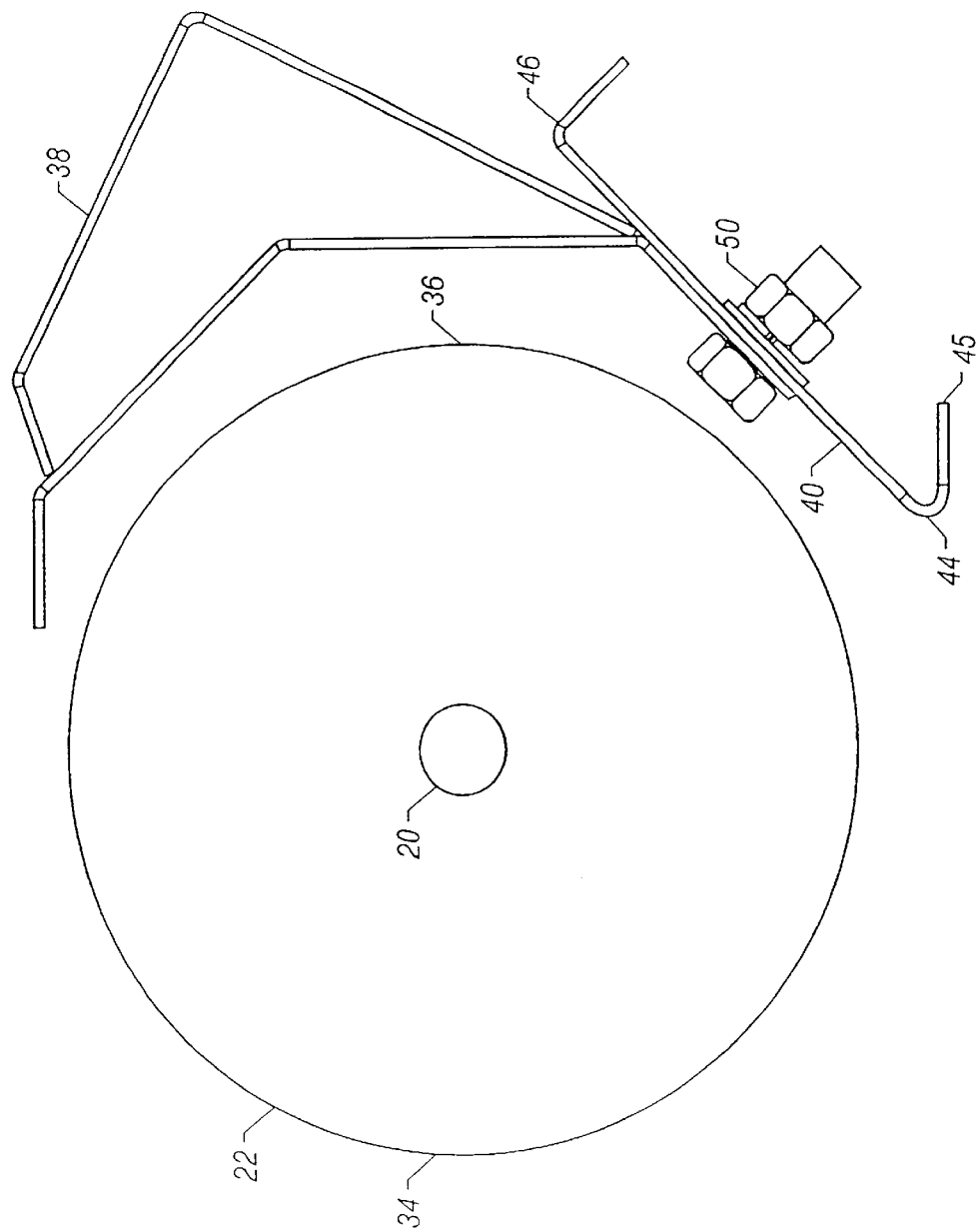
FIG. 3 is a view taken along lines 3—3 of FIG. 2.

As seen in FIGS. 2 and 3, the improved sweep auger of the present invention includes an attachment 40 in the form of one or more elongated panels 42 mounted on the rearward side of the backboard 38. Panels 42 include a lower edge 44 with an up-turned lip 45 and an upper edge 46. Preferably, the panels 42 includes slots 48 which allow adjustability of the panels 42 relative to the floor 16 of the bin 12. Thus, the space between the lower edge 44 and panels 42 and the floor 16 can be varied to accommodate variances in the floor arising from uneven concrete or steel floor installation or from equipment installed in the floor, such as sumps. The curved lower edge 44 easily rides over obstacles on the bin floor. As seen in FIG. 3, the lower edge 44 of the panels 42 extends beneath the auger flighting 22 so as to be in close proximity to the bin floor 16. Panels 42 are secured to the backboard 38 with a plurality of nut and bolt assemblies 50, or by a threaded insert fixed on the panel 42 and a bolt.

Figure 4:
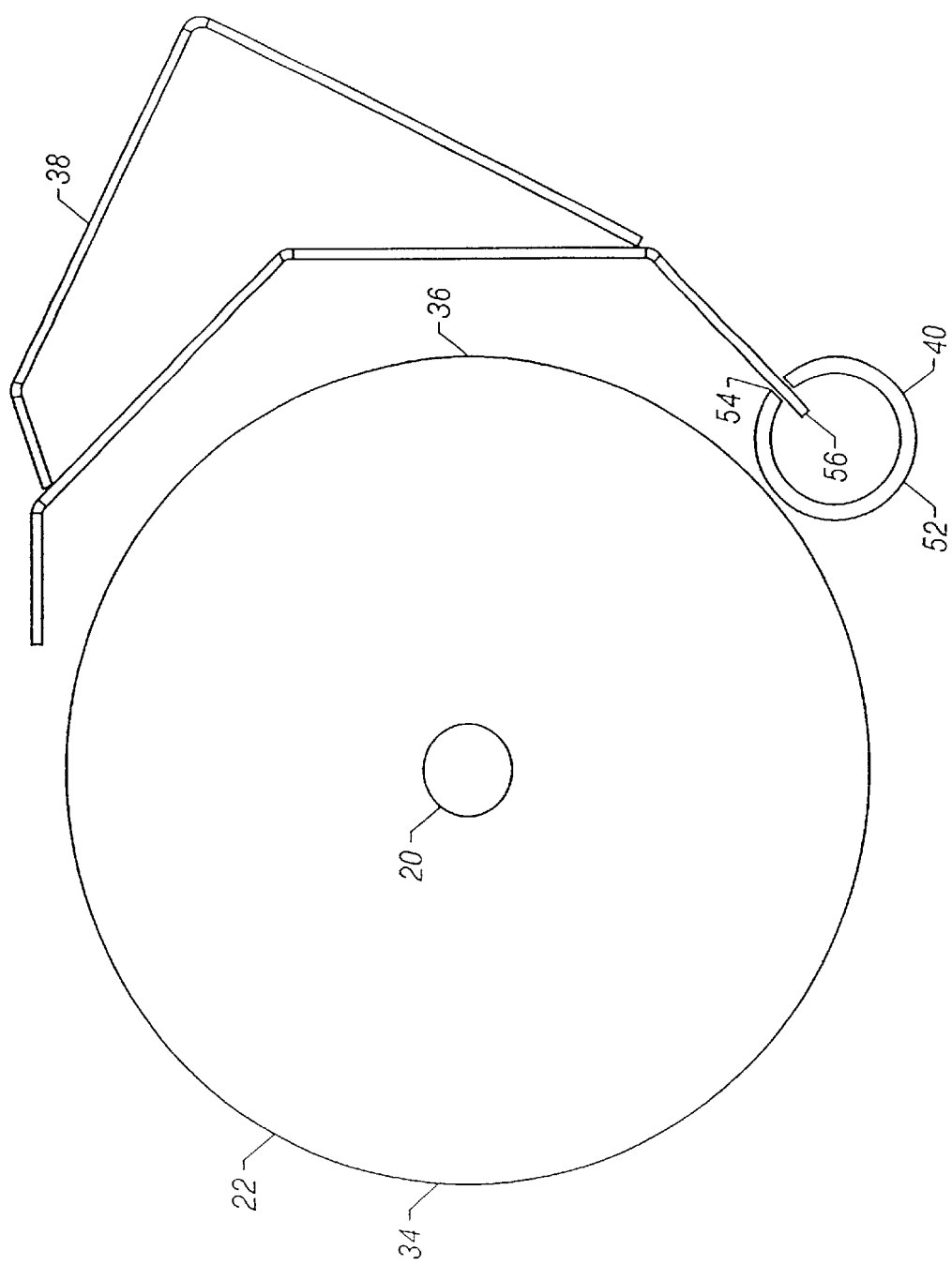
FIG. 4 is a view similar to FIG. 3 showing an alternative embodiment of the improved sweep auger of the present invention.

An alternative embodiment of the improved sweep auger of the present invention is shown in FIG. 4, wherein the attachment 40 comprises a round plastic tube 52. The tube 52 includes an elongated slot 54 extending along its length so as to receive a lower edge 56 of the backboard 38. The tube 52 is retained on the backboard 38 with a friction fit, or any other convenient manner. The tube 52 extends beneath the auger flighting 22 such that the lower perimeter of the tube 52 is in close proximity to the bin floor 16.

When bin 12 is loaded with free flowing material such as grain, the sweep auger apparatus 10 normally is positioned over the openings 28, as illustrated in FIG. 1. Gates (not shown) may be provided on one or more of the openings 28 to close the openings. In unloading the bin 12, the central opening or sump is first opened and as much grain is removed as will flow to that opening by gravity. This leaves a ring of the material covering the floor 16 to depths increasing in each radial direction from the central opening to the bin wall 14, i.e., as defined by an inverted cone having a vertical axis coincident with the central vertical axis of the bin 12, and its sides at the angle of repose of the material. The outer sumps are then opened and the material there over is permitted to flow downwardly therethrough by gravity to its angle of repose around the corresponding openings. This removes most of the material in one radial segment, above and around the sweep auger apparatus 10, thereby reducing the starting torque required to initiate operation of the relatively large sweep auger 18. The power drive to the sweep auger 18 is actuated such that the sweep auger advances slowly around the floor 16 of the bin 12, as driven by the drive wheel 24. The drive wheel 24 rolls on the floor 16 of the bin 12 and thus supports the radial outer end of the sweep auger 18. The wheel 24 provides a steady advancing force to continuously press the sweep auger 18 into the pile of remaining material. As the sweep auger 18 advances around the bin, the grain on the floor 16 is advanced by the flighting 22 and the panels 42 or tube 52 for discharge through the sump openings 28.

The sweep auger 18 typically makes a single revolution or sweep around the bin 12 to remove the ring of material which is outside the angles of repose of the material, and which therefore did not freely slide by gravity into the sump openings 28. Such a sweep revolution typically may take one hour or more, depending upon the quantity of material remaining for removal and the capacity of the flighting 22.

The preferred embodiment of the present invention has been set forth in the drawings and specification. Although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. An improved sweep auger for removing grain from a circular bin, the auger including a shaft with a radial longitudinal axis and opposite inner and outer ends, flighting extending along the shaft, the flighting having a leading edge and a trailing edge, a backboard extending along the shaft behind the trailing edge of the flighting, a wheel at the outer end of the shaft to support the shaft and auger above the floor, and a drive train for rotating the shaft and auger in a horizontal plane about a vertical axis at the center of the bin, the improvement comprising:

a rigid attachment adjustable mounted on the backboard and extending downwardly therefrom to a level below the flighting into close proximity to the bin floor to minimize the grain left behind the flighting; and the attachment having a curved surface adjacent the floor to prevent catching of the attachment on obstacles on the floor.

2. The sweep auger of claim 1 wherein the attachment is a flat scraper.

3. The sweep auger of claim 2 wherein the scraper has a forward leading edge and a rearwardly inclined trailing edge.

4. The sweep auger of claim 2 wherein the scraper includes slots to permit adjustable mounting to the backboard.

5. The sweep auger of claim 1 wherein the attachment is a tube mounted to a bottom edge of the backboard.

6. The sweep auger of claim 5 wherein the tube includes an elongated slot for receiving the bottom edge of the backboard.

7. The sweep auger of claim 5 wherein the tube is plastic.

8. The sweep auger of claim 5 wherein the tube is round in cross section.

9. The sweep auger of claim 1 wherein the attachment extends beneath the flighting.

10. In combination with a circular grain storage bin having a floor, an improved apparatus for moving granular material radially along the floor of the bin toward the center of the bin floor, said apparatus comprising:

an elongated auger with a longitudinal axis to be disposed radially of such a bin above and proximate the floor thereof, said auger having a leading edge and a trailing edge, the auger having an inner end disposed at the center of said bin and an opposite distal end disposed radially outward of the center of the bin, said inner end of said auger being connected to a power means at the center of said bin for rotating said auger about its longitudinal axis, a support and drive wheel located proximate to the distal end of said auger for supporting said distal end of said auger on said floor and for advancing said auger around the central vertical axis of said bin, the improvement comprising:

an elongated inclined panel mounted adjacent the trailing edge of the auger with an upper edge being rearward of a lower edge, adjustment means for raising or lowering the panel with respect to the bin floor to minimize the amount of granular material passing under the auger as it moves over the bin floor and to provide clearance for variations in the level of the bin floor; and a backboard extending along and behind the auger, the panel being adjustable mounted on the backboard.

11. The apparatus of claim 10 wherein the lower edge of the panel extends beneath the auger.

12. The apparatus of claim 10 wherein the adjustment means includes slots and mounting bolts extending through the slots to allow adjustable raising and lowering of the panel.

13. An improved apparatus for moving granular material radially of a circular storage bin along a floor of the bin toward the center of the bin floor, said apparatus comprising:

an elongated auger with a longitudinal axis to be disposed radially of such a bin above and proximate the floor thereof, said auger having a leading edge and a trailing edge, the auger having an inner end disposed at the center of said bin and an opposite distal end disposed radially outward of the center of the bin, said inner end of said auger being connected to a power means at the center of said bin for rotating said auger about its longitudinal axis, a support and drive wheel located proximate to the distal end of said auger for supporting said distal end of said auger on said floor and for advancing said auger around the central vertical axis of said bin, the improvement comprising:

a tubular member mounted adjacent the trailing edge of the auger and extending beneath the auger to minimize the amount of granular material passing under the auger as it moves over the bin floor.

14. The apparatus of claim 13 wherein the tubular member is plastic.

15. The apparatus of claim 13 wherein the tubular member is round in cross section.

16. The apparatus of claim 13 further comprising a backboard extending along and behind the auger, the tubular member being mounted on the backboard.

* * * * *